United States Patent
Endal et al.

(10) Patent No.: US 10,718,448 B2
(45) Date of Patent: Jul. 21, 2020

(54) REELABLE PIPE

(71) Applicant: Equinor Energy AS, Stavanger (NO)

(72) Inventors: Geir Endal, Stavanger (NO); Stein R Giske, Stavanger (NO); Andreia Cordeiro, Stavanger (NO); Luis Daniel Tavares Nogueira, Stavanger (NO)

(73) Assignee: EQUINOR ENERGY AS, Stavanger (NO)

( * ) Notice: Subject to any disclaimer, the term of this patent is extended or adjusted under 35 U.S.C. 154(b) by 10 days.

(21) Appl. No.: 16/345,423

(22) PCT Filed: Oct. 12, 2017

(86) PCT No.: PCT/NO2017/050263
§ 371 (c)(1),
(2) Date: Apr. 26, 2019

(87) PCT Pub. No.: WO2018/080312
PCT Pub. Date: May 3, 2018

(65) Prior Publication Data
US 2019/0271412 A1    Sep. 5, 2019

(30) Foreign Application Priority Data
Oct. 27, 2016 (GB) .................................. 1618183.6

(51) Int. Cl.
| F16L 1/12 | (2006.01) |
| F16L 1/26 | (2006.01) |
| F16L 1/20 | (2006.01) |
| F16L 9/18 | (2006.01) |
| F16L 11/20 | (2006.01) |
| F16L 59/14 | (2006.01) |

(52) U.S. Cl.
CPC .................. *F16L 1/203* (2013.01); *F16L 1/12* (2013.01); *F16L 1/26* (2013.01); *F16L 9/18* (2013.01); *F16L 11/20* (2013.01); *F16L 59/143* (2013.01)

(58) Field of Classification Search
CPC .................................. F16L 1/12; F16L 1/126
USPC ......... 138/140, 145, 149; 405/158, 169, 170
See application file for complete search history.

(56) References Cited

U.S. PATENT DOCUMENTS

| 5,447,390 | A | * | 9/1995 | Sparks ...................... F16L 9/12 166/367 |
| 2013/0240076 | A1 | | 9/2013 | van der Graaf |
| 2015/0104258 | A1 | * | 4/2015 | Varfolomeev .......... F16L 1/166 405/166 |

FOREIGN PATENT DOCUMENTS

| GB | 2 394 017 A | 4/2004 |
| GB | 2498740 A | 7/2013 |

(Continued)

OTHER PUBLICATIONS

International Search Report issued in PCT/NO2017/050263 (PCT/ISA/210), dated Dec. 11, 2017.

(Continued)

*Primary Examiner* — Sunil Singh
(74) *Attorney, Agent, or Firm* — Birch, Stewart, Kolasch & Birch, LLP

(57) ABSTRACT

A reelable pipeline includes a pipe-in-pipe section and a single pipe section coupled to the pipe-in-pipe section. The single pipe section has a bending stiffness that is different from the bending stiffness of the pipe-in-pipe section. The reelable pipeline includes a transition piece connected between the pipe-in-pipe section and the single pipe section and having a bending stiffness that varies along its length.

11 Claims, 2 Drawing Sheets

(56) References Cited

FOREIGN PATENT DOCUMENTS

KR    10-2014-0028502 A    3/2014
WO    WO 2009/109950 A2    9/2009

OTHER PUBLICATIONS

United Kingdom Search Report for Application No. GB1618183.6, dated Mar. 30, 2017.
Written Opinion of the International Searching Authority issued in PCT/NO2017/050263 (PCT/ISA/237), dated Dec. 11, 2017.

* cited by examiner

REELABLE PIPE

TECHNICAL FIELD

The present invention relates to reelable pipe. More specifically the invention relates to reelable pipe-in-pipe (PIP) technology for off-shore applications.

BACKGROUND

PIP technology is often used for subsea pipelines for transporting hydrocarbons. There are many documented benefits of employing PIP pipelines, including good passive insulation. The annulus of a PIP can also include heating elements for further temperature control. Reelable PIP pipeline can be spooled on to a reel and subsequently reeled out by a lay vessel (reel ship). The curvature of the pipeline introduced by the reel has to comply with the bending stiffness of the pipeline, to avoid damage to the pipeline. During laying, the pipeline is passed through a straightener fixed to the ramp at the aft of the lay vessel. The straightener eliminates the curvature of the pipeline introduced by the reel, and/or possibly applies some further bending configuration.

Traditionally, when deploying PIP from a reel, the PIP is cut to an exact length as it comes off the reel, and an end bulkhead is welded to it on the ramp of the lay vessel. This bulkhead is used to connect the pipeline to a connection structure (e.g. a subsea structure). This operation will generally involve cutting, welding, coating and non-destructive evaluation (NDE) of the PIP and bulkhead joint. The operation is relatively slow as it can be difficult to cut and weld the inner and outer pipes of a PIP section, which increases the off-shore time and hence the cost of deployment.

J. Boi et. al., "Development and Application of Reelable PiP Bulkhead Technology," Offshore Technology Conference (OTC) 23112, describes the use of reelable end bulkheads for lay-down of a fixed length PIP pipeline. The bulkheads can be welded to the PIP, coated and tested on-shore before spooling, which reduces operation time off-shore. However, because the length of the pipeline is fixed, meeting the axial lay tolerances of the pipeline becomes more difficult. This increases the costs for the connection structures and their installation.

SUMMARY OF THE INVENTION

According to a first aspect of the present invention there is provided a reelable pipeline comprising a pipe-in-pipe section and a single pipe section coupled to the pipe-in-pipe section. The single pipe section has a bending stiffness that is different from the bending stiffness of the pipe-in-pipe section, the reelable pipeline further comprising a transition piece connected between the pipe-in-pipe section and the single pipe section and having a bending stiffness that varies along its length.

The single pipe section may have a bending stiffness that is ±90%, ±80%, ±70%, ±60% or ±50% of the bending stiffness of the pipe-in-pipe section.

The transition piece may have:
 a bending stiffness at an end region adjacent to the pipe-in-pipe section which substantially matches the bending stiffness of the pipe-in-pipe section; and
 a bending stiffness at an end region adjacent to the single pipe section which substantially matches the bending stiffness of the single pipe section; and
 a bending stiffness in a region intermediate to said end regions which tapers between the bending stiffnesses of the end regions.

The outer diameter of the single pipe section may be different from the outer diameter of the pipe-in-pipe section by more than ±90% of the outer diameter of the pipe-in-pipe section.

According to a second aspect of the present invention there is provided a method of deploying a pipeline off-shore. The method comprises reeling a pipeline according to the above first aspect of the invention onto a reel so that the single pipe section is reeled on first. Then, at a deployment location, unreeling of the pipeline into the water is commenced. At a terminating location, the single pipe section is unreeled and the single pipe section cut through in order to obtain the correct pipeline length.

DETAILED DESCRIPTION

In order to address the problem of reducing lay-down time of PIP pipeline, whilst not having to lower the axial tolerances, it is desirable to provide a reelable pipeline which comprises as a major part a PIP pipeline and as a minor part a single pipe section coupled to the PIP pipeline. Such a pipeline could be efficiently cut at the single pipe section, and would hence enable efficient pipelaying of PIP from a reel, whilst not constraining the length of the pipeline.

The pipeline is manufactured and tested on-shore. The length of the pipeline, including the PIP section and the single pipe section, is slightly longer (e.g. 10 m) than the estimated required length of lay-down. A PIP end connector, such as a reelable end bulkhead, is connected to the end of the PIP section that goes into the water first. The pipeline is then spooled onto the reel of a lay vessel. The lay vessel transports the reeled pipeline to a first connection structure (e.g. a subsea connection structure), where it begins to unreel the pipeline, bulkhead first. As the pipeline is unreeled it passes through a straightener on a ramp on the lay vessel before entering the water. The lay vessel subsequently travels to a second connection structure while unreeling and laying down the pipeline. As the lay vessel approaches the second connection structure, the single pipe section starts to unreel. The single pipe section is then cut to the required length and fitted with an end connector, so that it can be connected to the second connection structure.

Problems may arise as a result of having connected sections of different pipe types in the same pipeline if there is a change in the bending stiffness going from one section to an adjacent section. During spooling, unreeling and straightening, the pipeline is subjected to significant stresses and strains. These stresses and strains can have a negative impact on pipeline integrity, potentially damaging the pipe wall or coating or both. For a pipeline with connected sections of different pipe types, the bending deformations caused by the bending stresses will tend to accumulate at the interconnection regions. This problem can be addressed by providing a transition part between the sections, which gradually changes the bending stiffness of the pipeline over the axial length of the transition, as well as accommodating the change in pipe diameter. Furthermore, the dimensions and materials of the single pipe can be chosen to substantially or partially match the bending stiffness of the single pipe section to that of the PIP.

Figure 1A:
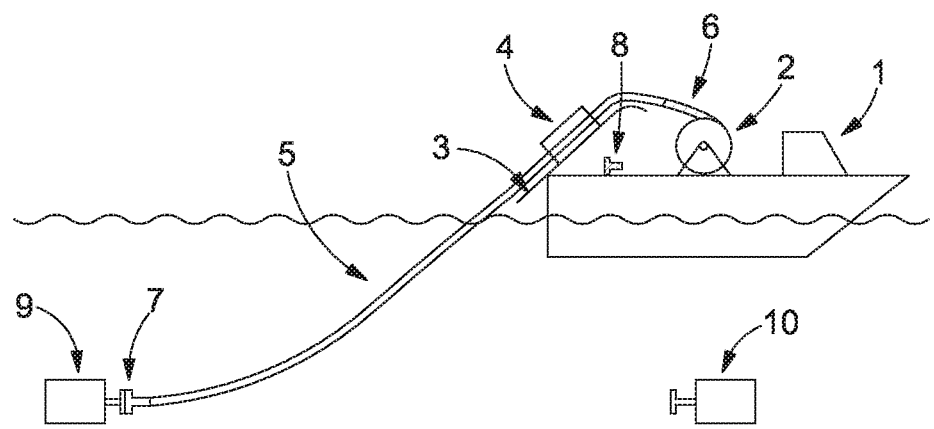
FIG. 1a illustrates a system for deployment of a pipeline as according to an embodiment of the invention.

FIG. 1a shows a lay vessel 1 with a reel 2, a ramp 3 and a straightener 4. The Figure shows a pipeline in the process of being unreeled from the reel. The pipeline comprises a PIP section 5, a single pipe section 6, a PIP end connector 7, a single pipe end connector 8. Also shown in the Figure are a first subsea connection structure 9 and a second subsea connection structure 10, with the pipeline being already attached to the first connection structure 9 by the PIP end connector 7.

As the lay vessel 1 travels from the first connection structure 9 towards the second connection structure 10, the pipeline is unreeled. As the lay vessel gets close to the second connection structure 10 the single pipe section 6 starts to come off the reel 2. The single pipe section 6 is then cut to length on the ramp 3, and fitted with an end connector 8. The pipeline is then connected to the second connection structure 10 by the single pipe end connector 8.

Figure 1B:
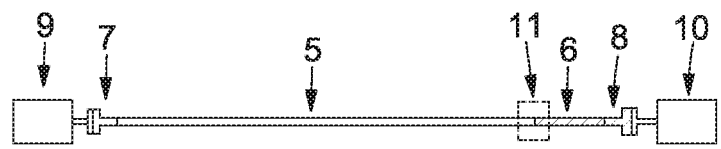
FIG. 1b illustrates a pipeline as according to an embodiment of the invention between two subsea connection structures.

FIG. 1b shows the completed pipeline extending from the first connection structure 9 to the second connection structure 10. The box 11 (shown with broken lines) marks the transition from the PIP section 5 to the single pipe section 6.

Figure 2:
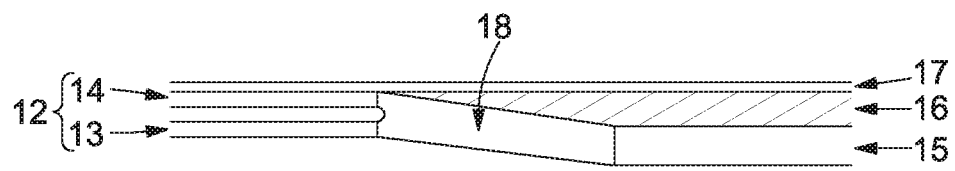
FIG. 2 is a transverse cross-sectional view of a portion of a pipeline according to an embodiment of the invention, the portion including a transition from PIP to single pipe.

FIG. 2 shows a transverse cross-section of a portion of the pipeline in the region marked by the box 11 in FIG. 1b. The illustrated portion includes a PIP section 12 with an inner pipe 13 and an outer pipe 14, a single pipe section 15, a thermal insulation layer 16 (e.g. polymer foam), a coating (e.g. rubber or multi-layer polymers) 17, and a transition piece 18. The load carrying structures, i.e. the inner pipe 13, the outer pipe 14 and the single pipe 15, are made of steel. The inner pipe 13 and the single pipe 15, which are in contact with the transported fluid, preferably comprise a corrosion resistant steel material.

The inner pipe 13 and the outer pipe 14 of the PIP 12 are both connected to one side of the transition piece 18, e.g. by welding. The other side of the transition piece 18 connects, again for example by welding, to the single pipe section 15. The single pipe section 15 may have a wall thickness that provides a bending stiffness that substantially matches that of the PIP section 12. Preferably, the bending stiffness of the single pipe cross-section may be within ±90%, ±80%, ±70%, ±50% of the bending stiffness of the PIP. The transition piece 18 has a bending stiffness in an end region adjacent to the PIP section 12 that substantially matches the bending stiffness of the PIP section 12, and a bending stiffness in an end region adjacent to the single pipe 15 that substantially matches the bending stiffness of the single pipe 15. The bending stiffness of the transition piece 18 changes gradually, e.g. linearly, in an intermediate region between the end regions. The gradual change of bending stiffness between the PIP section 12 and the single pipe section 15 reduces strain concentrations (strain localization) during reeling. It therefore helps prevent damage to the pipeline as it is spooled, unreeled and straightened. Specific requirements on the bending stiffness of the transition piece 18 and single pipe section 15 depend on the reel 2, straightener 4 and other installation conditions. For example, a reel with a greater radius can accommodate a larger difference in bending stiffness between sections of different pipes compared to a reel with a smaller radius.

In the embodiment shown in FIG. 2, the single pipe cross-section 15 has an external thermal insulation layer 16. The thermal insulation layer 16 is such that the insulated single pipe section has thermal transmission properties similar to those of the PIP section 12. The thermal insulation coating 16 hence limits the temperature gradient in line with the flow close to the transition piece 18. Reduced thermal insulation properties occur for a limited length of the transition piece 18.

The pipeline, including both the PIP and single pipe sections, has a thin protective outer coating layer 17, so that the thin coating layer 17 forms an unbroken outer sleeve over the entire length of the pipeline. This outer coating layer may be of rubber, multi-layer polymers, insulation material: e.g. polymer foams.

The outer diameter of the PIP section 12 and the outer diameter of the insulation layer 16 are approximately the same, in order to avoid any large discontinuity. The transition piece 18 accommodates a change from the inner diameter of the PIP section 12 to the inner diameter of the single pipe 15. The change is preferably small, in order to allow for pigging and other types of inspection of the pipeline.

Figure 3:
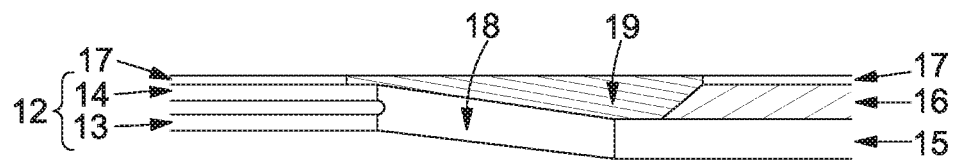
FIG. 3 is a transverse cross-sectional view of a portion of a pipeline according to a second embodiment of the invention, the portion including a transition from PIP to single pipe, with an external elastic coating around the transition area.

In a second embodiment of the invention, as illustrated in FIG. 3, an elastic coating 19 (e.g. an elastomeric polymer) covers the transition piece 18, extending between the PIP section and the thermal insulation layer 16. This coating 19 mitigates the tendency for cracks to form in the coating layer 17. The outer diameter of the elastic coating 19 matches the outer diameter of the thin coating 17. The elastic coating 19 extends laterally beyond the transition piece 18 to cover part of the PIP section 12 and the single pipe section 15.

Figure 4:
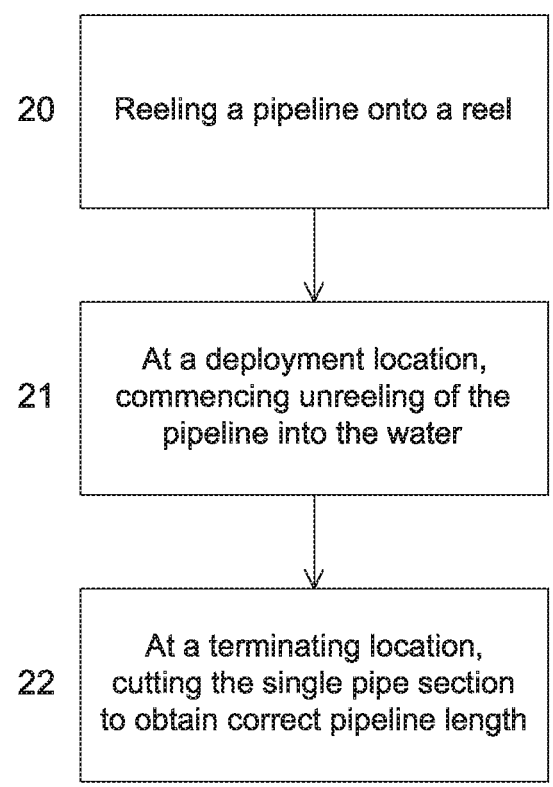
FIG. 4 is a flow diagram illustrating a method of deploying a pipeline.

FIG. 4 illustrates a method of deploying a pipeline in accordance with an embodiment of the invention. The figure includes the pipeline, as described above, being reeled onto a reel (step 20), at a deployment location, commencing unreeling of the pipeline (step 21), and at a terminating location cutting the single pipe section to obtain the correct pipeline length (step 22).

It will be appreciated by the person of skill in the art that various modifications may be made to the above described embodiments without departing from the scope of the invention. For example, the difference in the outer diameters of the PIP section and the single pipe section may be significant whilst minimising the difference in the inner diameters. This is accommodated by appropriate selections of wall thickness and by the design of the transition.

The inner diameter of the pipeline (the pipeline bore) may be different from the inner diameters of the PIP and the single pipe, by including several transition pieces, providing a gradual change in inner diameter.

The invention claimed is:

1. A reelable pipeline comprising:
    a pipe-in-pipe section;
    a single pipe section coupled to the pipe-in-pipe section, the single pipe section having a bending stiffness that is different from the bending stiffness of the pipe-in-pipe section; and
    a transition piece connected between the pipe-in-pipe section and the single pipe section and having a bending stiffness that varies along its length.

2. The pipeline according to claim 1, wherein the single pipe section has a bending stiffness that is ±90%, ±80%, ±70%, ±60% or ±50% of the bending stiffness of the pipe-in-pipe section.

3. The pipeline according to claim 1, wherein the transition piece is welded between the pipe-in-pipe section and the single pipe section.

4. The pipeline according to claim 1, the transition piece having:
- a bending stiffness at an end region adjacent to the pipe-in-pipe section which substantially matches the bending stiffness of the pipe-in-pipe section;
- a bending stiffness at an end region adjacent to the single pipe section which substantially matches the bending stiffness of the single pipe section; and
- a bending stiffness in a region intermediate to said end regions which tapers between the bending stiffnesses of the end regions.

5. The pipeline according to claim 1, further comprising an elastic material surrounding the transition piece.

6. The pipeline according to claim 1, further comprising a thermally insulating coating layer covering the single pipe section.

7. The pipeline according to claim 1, wherein the outer diameter of the single pipe section is different from the outer diameter of the pipe-in-pipe section by more than ±90% of the outer diameter of the pipe-in-pipe section.

8. The pipeline according to claim 1, further comprising a protective outer coating covering the pipe-in-pipe section and the single pipe section.

9. The pipeline according to claim 1, the pipeline being located on a reel.

10. A method of deploying a pipeline off-shore, comprising:
- reeling the pipeline according to claim 1 onto a reel so that the single pipe section is reeled on first;
- at a deployment location, commencing unreeling of the pipeline into the water; and
- at a terminating location, unreeling the single pipe section and cutting through the single pipe section in order to obtain the correct pipeline length.

11. The method according to claim 10, further comprising fitting an end connector to the cut end of the single pipe section of the pipeline.

* * * * *